March 22, 1938.                O. CRUTCHFIELD                2,111,965
                                ADJUSTABLE HANDLE
                                Filed Sept. 8, 1936
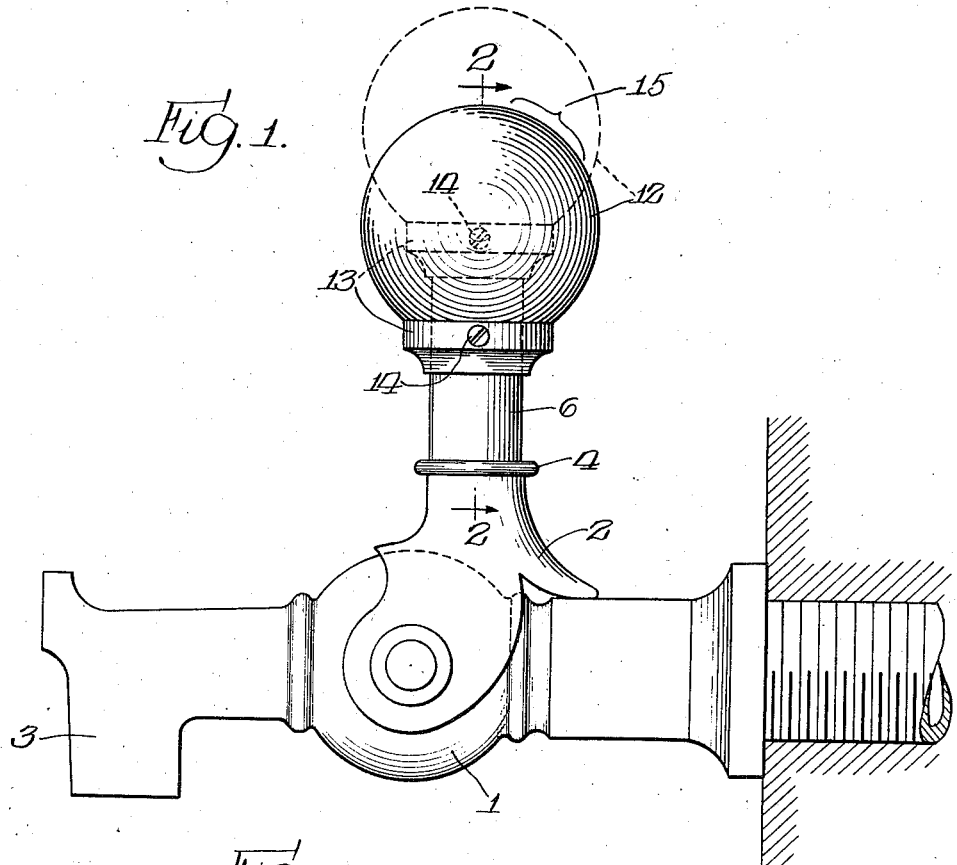
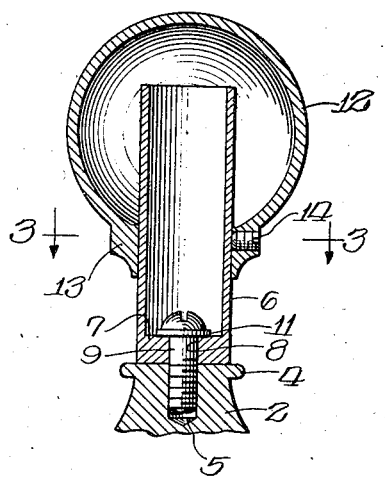
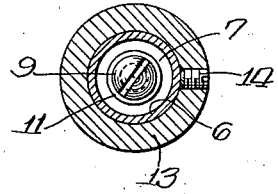
Inventor:—
Oliver Crutchfield,
By Wilson, Dowell, McCanna & Foley Attys.

Patented Mar. 22, 1938

2,111,965

UNITED STATES PATENT OFFICE 2,111,965

ADJUSTABLE HANDLE

Oliver Crutchfield, Chicago, Ill.

Application September 8, 1936, Serial No. 99,885

1 Claim. (Cl. 16—121)

This invention relates to an extension for valve handles and is particularly useful in extensions for handles of beer faucets in communities where it is required by ordinance that the handle of each beer faucet or valve carry the name of the brand of beer dispensed thereby, with the name displayed at such a height that it can be viewed over the bar by the customers.

In view of such ordinances and because beer faucets in various types of beer cooling apparatus are positioned at various heights relatively to the surface of the bar, it has been necessary heretofore, in compliance with such ordinances, to utilize various complex and usually unsatisfactory devices for extending the handles of the beer faucets to bring the name plate up to the height required by the ordinances. My invention provides a simple, neat and inexpensive device for accomplishing this desired object.

In the drawing, a preferred embodiment of the invention is shown for illustrating the nature of the invention, but it should be understood that the invention is not limited to the selected embodiment.

In the drawing:

Fig. 1 is a side elevation showing my invention applied to a beer faucet;

Fig. 2 is a sectional view on the line 2—2 of Fig. 1; and

Fig. 3 is a sectional view on the line 3—3 of Fig. 2.

Referring further to the drawing, a valve body 1 of a typical beer faucet is shown as having a valve operating handle 2 which is employed to open the valve by pulling the handle toward spout 3 of the faucet. This invention is not concerned with the construction of the interior of the valve, hence the same is not shown.

A valve handle of this type usually terminates at the shoulder 4 and is provided with an internally threaded opening 5 for receiving a screw.

A hollow sleeve 6, having a wall or partition 7 in one end thereof provided with an opening 8, is connected to the valve handle 2 by means of a screw 9 whose head lies inside of the sleeve. A lock washer 11 of usual construction may be employed as a means for locking the screw against rotation when the sleeve has been connected to the valve handle. The length of the sleeve will be sufficient so that the ball secured thereon may be adjusted to the height required by law. The upper end of the sleeve is left open so that a screw driver may be inserted therethrough to rotate the screw.

A hollow ball 12 having a thickened collar 13 is secured at the desired height upon the sleeve by means of a set screw 14. This ball will carry painted, or otherwise disposed on its surface, preferably in the area indicated as 15, the name of the brand of beer dispensed by the faucet.

In view of the construction of this invention the sleeve 6 may be finished in chromium plating which need not be marred at all when the extension is applied to the valve handle. The lower end of the sleeve seats flatly against the flat surface of the valve handle and the tightening of the screw against the lock washer prevents the sleeve from rotating.

The diameter of the ball will be sufficiently large to form a convenient grip for the bartender and to provide ample space for the name of the beer and, at the same time, provide ample space into which the open end of the sleeve may extend for purposes of adjustment.

After the sleeve has been secured to the valve handle, the ball, of course, will be set upon the sleeve at the proper height to make the legend which it carries visible over the bar and will be set on the sleeve in such a position that the legend will face the customers on the outer side of the bar.

The hollow tube is especially useful in that it will minimize, together with the hollow ball, the weight of the extension, an important advantage in the fast and easy operation of the beer valve. Also the shock to the valve body when the valve handle is slammed up or down is less when the handle extension is not solid.

Having shown and described my invention, I claim:

An adjustable handle extension for a valve comprising a hollow tubular member open at one end and having a wall in the other end provided with a central opening, a screw extending through said opening for threaded engagement with a valve handle, a hollow ball into which the open end of said sleeve member may extend at various distances, and means for securing said ball to said member selectively at various distances from the closed end of the sleeve.

OLIVER CRUTCHFIELD.